United States Patent
Iizuka et al.

(10) Patent No.: US 9,515,327 B2
(45) Date of Patent: Dec. 6, 2016

(54) FUEL CELL SEPARATOR, METHOD FOR MANUFACTURING THE FUEL CELL SEPARATOR, AND FUEL CELL

(75) Inventors: Kazutaka Iizuka, Nisshin (JP); Masakazu Suzuki, Toyota (JP); Masanori Matsukawa, Obu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1106 days.

(21) Appl. No.: 12/376,994

(22) PCT Filed: Aug. 8, 2007

(86) PCT No.: PCT/JP2007/065877
§ 371 (c)(1),
(2), (4) Date: Oct. 7, 2009

(87) PCT Pub. No.: WO2008/029598
PCT Pub. Date: Mar. 13, 2008

(65) Prior Publication Data
US 2010/0040933 A1  Feb. 18, 2010

(30) Foreign Application Priority Data
Sep. 4, 2006  (JP) .................. 2006-239426

(51) Int. Cl.
H01M 8/02  (2016.01)
H01M 8/10  (2016.01)

(52) U.S. Cl.
CPC ......... H01M 8/0228 (2013.01); H01M 8/0271 (2013.01); H01M 8/0286 (2013.01);
(Continued)

(58) Field of Classification Search
CPC .... H01M 8/0245; H01M 4/88; H01M 8/0228; H01M 8/0271; H01M 8/0286; H01M 8/0206; H01M 8/0284; H01M 2008/1095; Y02E 60/50
(Continued)

(56) References Cited

U.S. PATENT DOCUMENTS

2005/0100771 A1  5/2005  Vyas et al.
2006/0099330 A1*  5/2006  Nakamura et al. .......... 427/115
(Continued)

FOREIGN PATENT DOCUMENTS

CA  1 103 206 A  6/1981
JP  53-102278 A  9/1978
(Continued)

OTHER PUBLICATIONS

Machine Translation of JP2000-353532.*
(Continued)

*Primary Examiner* — Nicholas P D'Aniello
*Assistant Examiner* — Stephen Yanchuk
(74) *Attorney, Agent, or Firm* — Andrews Kurth Kenyon LLP

(57) ABSTRACT

A fuel cell separator is provided with an opening that functions as a manifold. A resin coating is formed within the peripheral area of the fuel cell separator, in a state where the power generation area is masked with a masking jig. Subsequently, the masking jig is removed, and a conductive coating is formed within the power generation area of the fuel cell separator, the peripheral area of which has been masked by the resin coating.

8 Claims, 4 Drawing Sheets

(52) U.S. Cl.
CPC ........ *H01M 8/0206* (2013.01); *H01M 8/0284* (2013.01); *H01M 2008/1095* (2013.01); *Y02E 60/50* (2013.01); *Y02P 70/56* (2015.11)

(58) Field of Classification Search
USPC .................................................. 429/456–460
See application file for complete search history.

(56) References Cited

U.S. PATENT DOCUMENTS

2006/0127724 A1* 6/2006 Kusakabe et al. .............. 429/30
2006/0134509 A1* 6/2006 Ping et al. ...................... 429/44

FOREIGN PATENT DOCUMENTS

| JP | 11-345620 A | 12/1999 |
|---|---|---|
| JP | 2000-100452 A | 4/2000 |
| JP | 2000-353532 A | 12/2000 |
| JP | 2002-025574 A | 1/2002 |
| JP | 2005-005137 A | 1/2005 |
| JP | 2005-158441 A | 6/2005 |
| JP | 2005-166576 A | 6/2005 |
| JP | 2005-235739 A | 9/2005 |
| JP | 2005-243355 A | 9/2005 |
| JP | 2007-012300 A | 1/2007 |
| WO | WO 2005/048375 A2 | 5/2005 |
| WO | WO2005-064726 * | 7/2005 |
| WO | 2006030276 A2 | 3/2006 |

OTHER PUBLICATIONS

Machine Translation of JP 2005-005137.*
Office Action issued Jan. 28, 2011 in CN 200780032646.6 and English translation thereof.
Office Action issued Jan. 21, 2011 in Canadian Application No. 2,660,985.

* cited by examiner

FUEL CELL SEPARATOR, METHOD FOR MANUFACTURING THE FUEL CELL SEPARATOR, AND FUEL CELL

This is a 371 national phase application of PCT/JP2007/065877 filed 8 Aug. 2007, claiming priority to Japanese Patent Applications No. JP 2006-239426 filed 4 Sep. 2006, the contents of which are incorporated herein by reference.

TECHNICAL FIELD

The present invention relates to a fuel cell separator, and relates particularly to a coating technology for a fuel cell separator.

BACKGROUND ART

Fuel cells, which convert the chemical energy obtained by reacting a fuel gas comprising hydrogen with an oxidizing gas comprising oxygen to electrical energy are already known. Fuel cells are used, for example, by mounting in vehicles or the like, and can be used as the power source or the like for a motor used for driving the vehicle.

In order to prevent corrosion caused by the water generated as a result of the chemical reaction, the components used in fuel cells must exhibit corrosion resistance. For example, the separator used in a fuel cell (namely, the fuel cell separator) is typically covered with a resin coating in order to enhance the corrosion resistance.

Accordingly, a variety of conventional techniques have been proposed for coating fuel cell separators. Patent Document 1 (JP 2000-353532A) discloses a technique wherein the surface of a plate used in a fuel cell is coated with a resin to form a coating layer, the coating layer formed on the outside surface of the plate is removed to expose the outside surface of the plate, and a plating layer composed of a metal material is then formed on the exposed portion of the plate.

Furthermore, Patent Document 2 (JP 2005-166576 A) discloses a technique for forming a thin film of a rubber-like elastic body around the peripheral portions of a separator using insertion molding, and Patent Document 3 (JP 2005-5137 A) discloses a technique for forming a conductive coating layer on the conductive surface of a separator using a resin or the like that contains a conductive material.

DISCLOSURE OF INVENTION

However, there are a number of factors which still require improvement in conventional coating techniques for fuel cell separators.

For example, in the technique disclosed in Patent Document 1, the step of removing the coating layer is complex, and furthermore, the document does not provide a technique for coating a manifold portion with a resin. Moreover, in Patent Document 2, although the thin film of a rubber-like elastic body prevents corrosion of the peripheral portions, the document provides no specific techniques relating to factors such as the regions to be subjected to conductive coating. Furthermore, Patent Document 3 is not a technique in which a conductive coating layer is formed over the entire region facing the MEA (membrane electrode assembly).

The present invention has been developed with due consideration of these conventional techniques, and has an advantage of providing a novel coating technique for a fuel cell separator.

In order to realize the above advantage, a fuel cell separator of a preferred aspect of the present invention is a fuel cell separator comprising a conductive coating and a resin coating formed on a plate-like separator substrate, wherein the separator substrate has a power generation area that faces a power generating layer and a peripheral area that comprises an opening that functions as a manifold, substantially all of the power generation area is coated with a conductive coating, and the peripheral area is coated with a resin coating so that the opening that functions as a manifold is coated with a resin coating.

In the above aspect, the conductive coating is formed using a material for which at least one of the conductivity and the corrosion resistance is superior to that of the surface of the separator substrate. Specific examples of the conductive coating include metal plating and the like. Furthermore, the conductive coating and the resin coating may be formed, for example, using electrodeposition treatments. According to the above aspect, a fuel cell separator can be provided in which the opening that functions as a manifold is coated with a resin coating and substantially all of the power generation area is coated with a conductive coating.

In a preferred aspect of the fuel cell separator, in the area of contact between the separator substrate and the resin coating, the conductive coating is not disposed therebetween. As a result, a potential problem wherein the resin coating is formed on top of the conductive coating, causing the resin coating to become prone to detachment, can be prevented.

In a preferred aspect, the resin coating and the conductive coating are formed as a continuous coating in which the respective boundaries of the coatings contact each other. As a result, the possibility of the boundary portion between the resin coating and the conductive coating acting as a starting point for corrosion is suppressed to an extremely low level.

Furthermore, a fuel cell according to another preferred aspect of the present invention comprises the fuel cell separator described above, wherein a power generating layer is laminated to the fuel cell separator so as to face the power generation area thereof, a plurality of fuel cell unit cells formed from the fuel cell separator and the power generating layer are laminated, and a manifold is formed from an opening provided in the peripheral area of the fuel cell separators.

Furthermore, in order to realize the advantage described above, a manufacturing method according to a preferred aspect of the present invention is a method for manufacturing a fuel cell separator comprising a conductive coating and a resin coating formed on a plate-like separator substrate, the method comprising: a first coating step of forming a resin coating within a peripheral area of the separator substrate that comprises an opening that functions as a manifold, and a second coating step of forming a conductive coating within a power generation area of the separator substrate that faces a power generating layer.

In a preferred aspect, the second coating step comprises coating the separator substrate, using a metal plating as the conductive coating, with the peripheral area comprising the opening masked with the resin coating of the first coating step.

The present invention provides a novel coating technique for a fuel cell separator. Accordingly, a fuel cell separator can be provided in which, for example, an opening that functions as a manifold is coated with a resin coating, and a conductive coating is formed across substantially all of the power generation area.

Further, by ensuring that the conductive coating is not formed within the area of contact between the separator substrate and the resin coating, the durability of the adhesion between the separator substrate and the resin coating can be improved. Furthermore, by forming a continuous coating in which the respective boundaries of the resin coating and the conductive coating contact each other, the possibility of the boundary portion between the resin coating and the conductive coating acting as a starting point for corrosion can be suppressed to an extremely low level.

Furthermore, by forming the conductive coating within the power generation area following formation of the resin coating within the peripheral area of the separator substrate, the resin coating functions as a mask during formation of the conductive coating, meaning a separate masking operation is not required for the conductive coating.

BEST MODE FOR CARRYING OUT THE INVENTION

A preferred embodiment of the present invention is described below.

Figure 1:
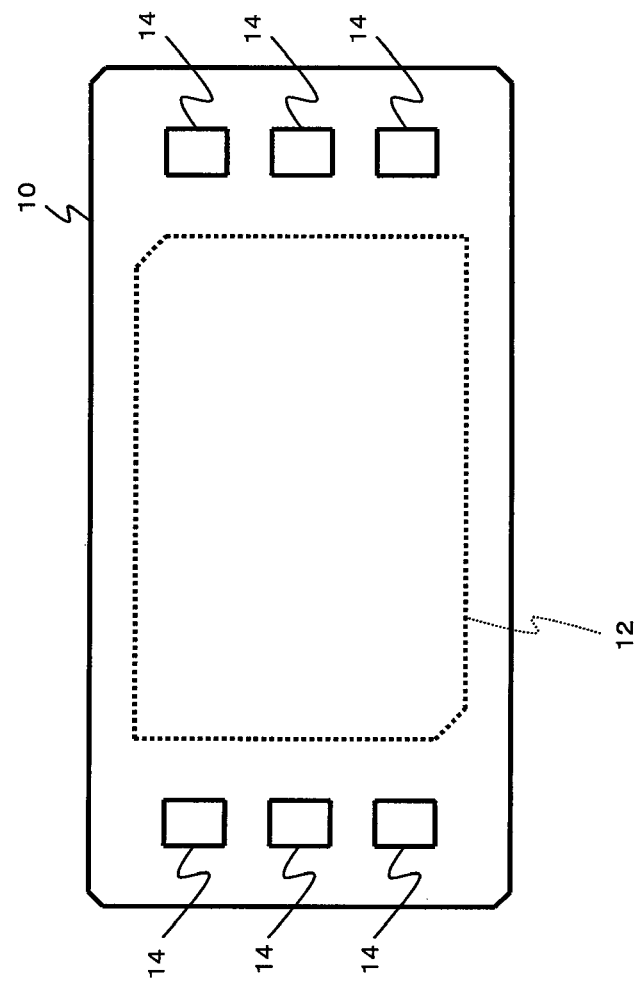
FIG. 1 is a schematic illustration of a fuel cell separator 10 according to the present invention.

FIG. 1 describes a preferred embodiment of the present invention, and represents a schematic illustration of a fuel cell separator 10 according to the present invention.

In the fuel cell separator 10, the upper and lower surfaces are formed of a substantially rectangular plate-like member. The fuel cell separator 10 is formed from a material that exhibits conductivity such as a SUS material or carbon.

A power generation area 12 that faces a power generating layer is provided in the center of the substantially rectangular surface of the fuel cell separator 10. For example, in a case where a unit cell is formed be sandwiching a MEA (membrane electrode assembly) that functions as a power generating layer between two fuel cell separators 10, the MEA is laminated so as to face the power generation area 12 of the fuel cell separators 10.

A fuel cell is then formed by laminating a plurality of these unit cells comprising a MEA sandwiched between two fuel cell separators 10.

Furthermore, a plurality of openings 14 are provided in the peripheral portion around the substantially rectangular surface of the fuel cell separator 10, namely, in the peripheral area that surrounds the power generation area 12 but excludes the power generation area 12. In FIG. 1, three openings 14 are provided at each end in the lengthwise direction of the fuel cell separator 10. The positioning and shape of the openings 14 illustrated in FIG. 1 merely represent one possible example.

When a fuel cell is formed using this fuel cell separator 10, the openings 14 provided in the fuel cell separator 10 function as a manifold. The water and the like generated following the chemical reaction between the fuel gas and the oxidizing gas flows through the manifold. Accordingly, in order to prevent corrosion caused by the generated water, the openings 14 that form the manifold are coated with a resin coating.

The resin coating is formed across substantially all of the peripheral area of the fuel cell separator 10. In FIG. 1, the resin coating is formed across the entire area outside of the power generation area 12 of the fuel cell separator 10. On the other hand, a conductive coating is formed across substantially all of the power generation area 12. In the present embodiment, during formation of the resin coating within the peripheral area of the fuel cell separator 10, a masking jig is used to mask those areas that do not require a resin coating.

Figure 2:
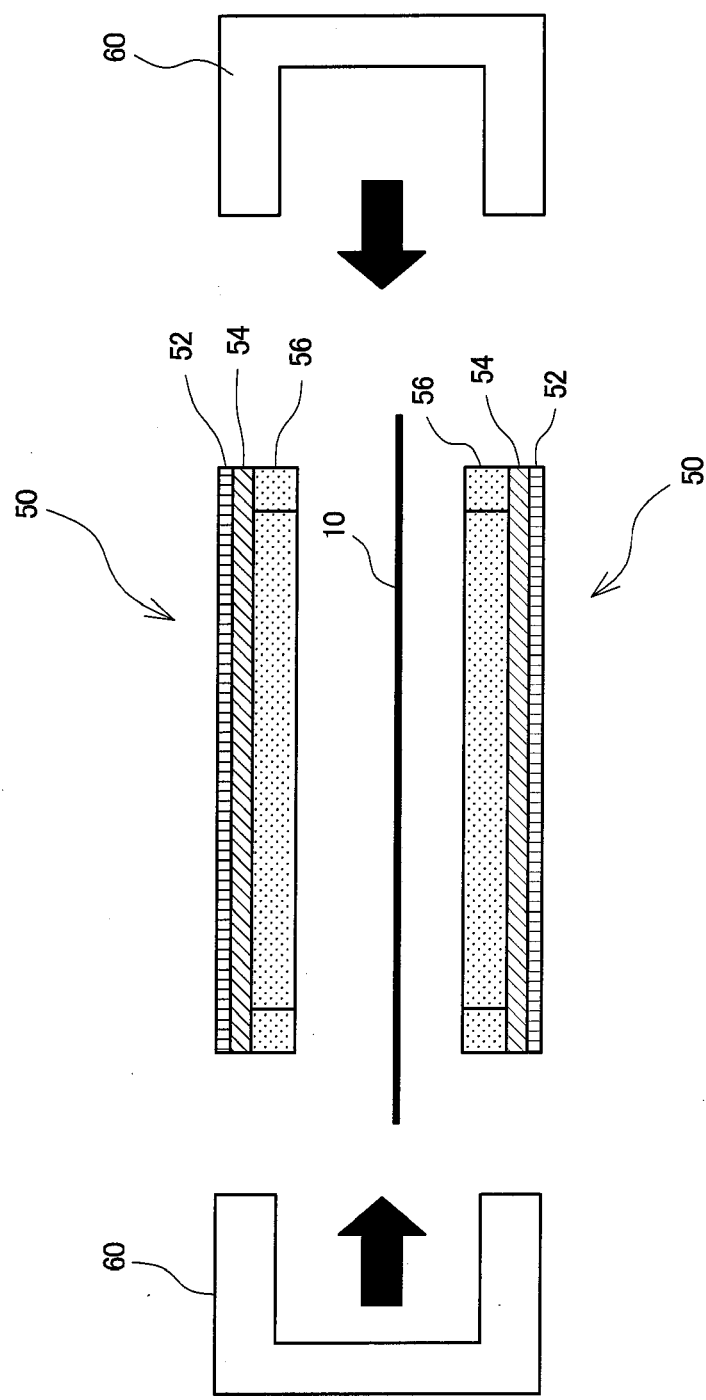
FIG. 2 is a diagram describing a state in which a fuel cell separator is masked with a masking jig.
Figure 3:
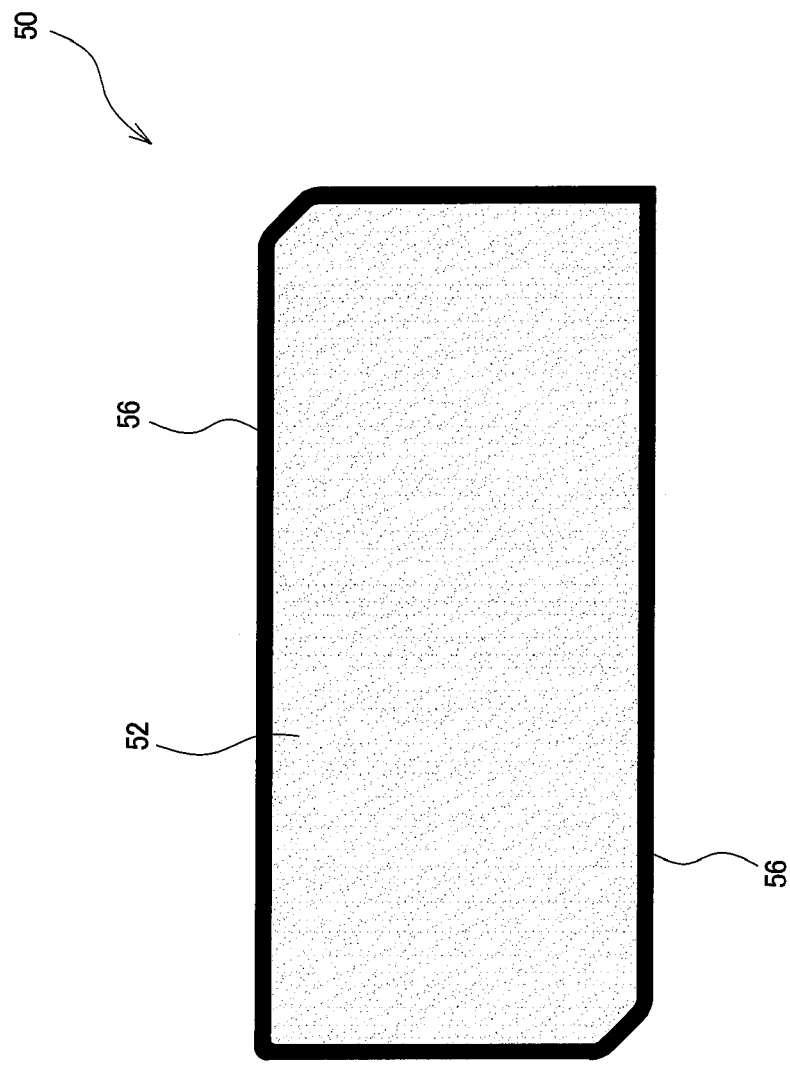
FIG. 3 is a diagram describing the construction of a masking jig.

FIG. 2 and FIG. 3 are diagrams that describe a masking jig 50 used in the present embodiment. The masking jig 50 sandwiches the plate-like fuel cell separator 10 from both the upper and lower surfaces, and masks those areas on the upper and lower surfaces of the fuel cell separator 10 that do not require a resin coating.

FIG. 2 is a diagram describing a state in which the fuel cell separator 10 is masked with the masking jig 50. FIG. 2 illustrates a state in which the fuel cell separator 10 is sandwiched between two masking jigs 50, viewed from the side surface (the long side) of the fuel cell separator 10.

As illustrated in FIG. 2, during the masking process, two masking jigs 50 corresponding with the upper and lower (top and bottom) surfaces of the fuel cell separator 10 are used. Each masking jig 50 has a structure in which a cage-like frame 54 is laminated to a sheet-like resin protective material 52, and a cage-like masking material 56 is laminated to the frame 54.

Once the two masking jigs 50 are used to sandwich the fuel cell separator 10 and are positioned in close contact with the fuel cell separator 10, two clamping jigs 60 are fitted from the short sides (left and right sides) of the fuel cell separator 10. As a result, the two masking jigs 50 are secured by the two clamping jigs 60 in an arrangement where the masking jigs 50 sandwich the fuel cell separator 10.

FIG. 3 is a diagram describing the construction of the masking jig 50, and illustrates the masking jig 50 viewed from the side of the surface that contacts the fuel cell separator 10.

The masking material 56 is provided on the masking jig 50. The masking material 56 is provided so as to surround the outer periphery of the masking jig 50. The area surrounded by the masking material 56 corresponds with the power generation area (symbol 12 in FIG. 1) of the fuel cell separator.

When the masking jigs 50 are sandwiched on both sides of the fuel cell separator, the masking material 56 makes close contact around the outer periphery of the power generation area of the fuel cell separator. The masking material 56 is provided with no gaps around the entire periphery, and by bringing the masking material 56 into close contact around the outer periphery of the power generation area, the entire power generation area is masked.

In the present embodiment, a resin coating is formed on the fuel cell separator using the masking jigs 50. Moreover, following formation of the resin coating, a conductive coating is formed on the fuel cell separator. Accordingly, next is a description of a coating treatment of the present embodiment.

Figure 4:
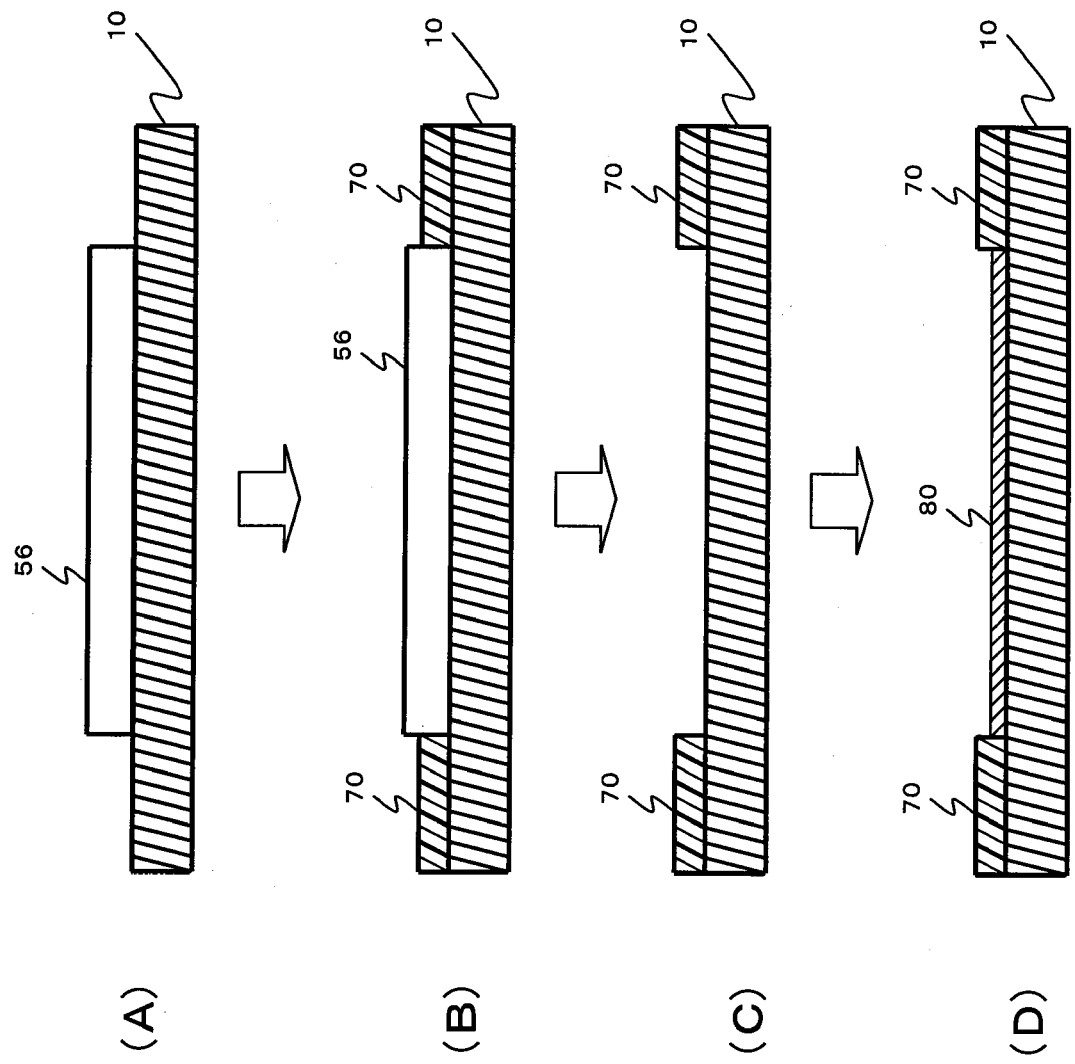
FIG. 4 is a diagram describing a coating treatment for a fuel cell separator.

FIG. 4 is a diagram describing the coating treatment according to the present embodiment. FIGS. 4(A) to 4(D) illustrate the surface portion of the fuel cell separator 10 in each of the steps of the coating treatment. FIGS. 4(A) to 4(D) are each illustrated from the side surface (the long side) of the fuel cell separator 10. Moreover, although FIG. 4 only illustrates the coating treatment for one surface (the upper surface) of the fuel cell separator 10, the same coating treatment is also performed on the other surface (the lower surface) of the fuel cell separator 10.

FIG. 4(A) illustrates a state in which the surface of the fuel cell separator 10 has been masked. In other words, FIG. 4(A) illustrates a state in which a masking jig (symbol 50 in FIG. 3) has been laminated to the surface of the fuel cell separator 10, with the masking material 56 of the masking jig in close contact with the surface of the fuel cell separator 10.

As described above (see FIG. 2 and FIG. 3), the masking material 56 is brought into close contact around the outer periphery of the power generation area of the fuel cell separator 10, thereby masking the entire power generation area. In other words, in FIG. 4(A), the surface of the fuel cell separator 10 that contacts the masking material 56 is masked.

Subsequently, as illustrated in FIG. 4(B), the surface of the fuel cell separator 10 is coated with a resin film 70 while masked with the masking material 56.

The coating of the resin film 70 is performed using an electrodeposition treatment (for example, electrodeposition using a polyimide or a modified polyimide coating material), wherein a cationic resin obtained by ionizing a portion of a resin powder is electrodeposited on the surface of the fuel cell separator 10. During the electrodeposition treatment, by immersing the fuel cell separator 10 in a solution comprising the cationic resin, bringing a terminal into contact with the fuel cell separator 10, applying an anodic voltage to the terminal, and applying a cationic voltage to a counter electrode, the cationic resin is attracted to the fuel cell separator 10, and the cationic resin is deposited on the surface of the fuel cell separator 10. During this process, because the fuel cell separator 10 has been masked, the cationic resin is deposited on the area not masked by the masking material 56, namely, the peripheral area of the fuel cell separator 10. By performing this electrode position treatment, a uniform and dense film of the resin powder is coated onto the surface of the peripheral area of the fuel cell separator 10.

In the present embodiment, following the coating of the surface of the fuel cell separator 10 with the resin powder, the masking jig is removed from the fuel cell separator 10, and a baking treatment is performed to bake the resin powder onto the surface of the fuel cell separator 10. The uniformity and denseness of the resin coating are further improved by melting the resin powder adhered to the surface of the fuel cell separator 10, and the resin is subsequently cured, forming a resin film 70 on the surface of the fuel cell separator 10.

Although a dense resin coating can be obtained by performing only the electrodeposition treatment, by melting the resin in a baking treatment, microscopic holes that exist between particles of the resin can be completely sealed, enabling the formation of an extremely dense and uniform resin film 70.

As illustrated in FIG. 4(C), because the resin film 70 is formed in this manner on the peripheral area of the fuel cell separator 10, the openings (symbol 14 in FIG. 1) that function as the manifold are coated with the resin film 70.

Subsequently, as illustrated in FIG. 4(D), a plating film 80 is coated onto the surface of the fuel cell separator 10 having the resin film 70 formed thereon.

Electrodeposition coating is also used for the coating of the plating film 80, wherein an ionized metal (for example, a complex ion of gold) is electrodeposited on the surface of the fuel cell separator 10. During the electrodeposition treatment, by immersing the fuel cell separator 10 in a solution comprising metal complex ions, bringing a terminal into contact with the fuel cell separator 10, and then causing a current to flow with the fuel cell separator 10 set as the cathode, the complex ions are attracted to the fuel cell separator 10, and the metal within these complex ions is deposited on the surface of the fuel cell separator 10. During this process, because the resin film 70 has been formed on the fuel cell separator 10, the resin film 70, which has insulating properties, functions as a mask. Accordingly, the metal within the complex ions is deposited within the area where the resin film 70 is not formed, namely, within the power generation area of the fuel cell separator 10, thereby forming the plating film 80.

In this manner, as illustrated in FIG. 4(D), the resin film 70 is formed within the peripheral area of the fuel cell separator 10, while the plating film 80 is formed within the power generation area of the fuel cell separator 10.

In the present embodiment, the plating film 80 is formed following formation of the resin film 70 on the fuel cell separator 10, and no plating film 80 is disposed between the fuel cell separator 10 and the resin film 70. As a result, the durability of the adhesion between the fuel cell separator 10 and the resin film 70 is extremely high.

Furthermore, the plating film 80 is formed with the resin film 70 functioning as a mask, meaning the respective boundary portions of the resin film 70 and the plating film 80 contact each other, forming a continuous coating. As a result, the boundary portion between the resin film 70 and the plating film 80 is very unlikely to act as a starting point for corrosion. Moreover, because the resin film 70 functions as a mask, a masking operation need not be conducted for the formation of the plating film 80.

A preferred embodiment of the present invention is described above, but in all respects, the above embodiment is merely exemplary, and in no way limits the scope of the present invention. For example, in the embodiment described above, an electrodeposition treatment is used during the resin coating, but instead of using this electrodeposition treatment, the resin coating may also be formed using injection molding or the like. Furthermore, in the case of the conductive coating, instead of using an electrodeposition treatment, another coating treatment such as painting, vacuum deposition, sputtering or ion plating may also be used. Moreover, instead of using gold (Au), the conductive coating may also be formed using copper, silver, platinum, palladium or carbon or the like.

Furthermore, in the present embodiment described above, as illustrated in FIG. 3, the masking material 56 is formed as a cage-like frame, but the masking material 56 may also be formed as either a solid body or a hollow body. Moreover, in the present embodiment, as illustrated in FIG. 2, the clamping jigs 60 are fitted from the short sides of the fuel cell separator 10, but the clamping jigs 60 may also be fitted from the long sides of the fuel cell separator 10.

The invention claimed is:

1. A method for manufacturing a fuel cell separator comprising a conductive coating and a resin coating formed on a separator substrate, the method comprising:
   a first coating step of coating a peripheral area of the separator substrate that comprises an opening that functions as a manifold with a resin coating, wherein the area coated with the resin coating in the first coating step surrounds a power generation area of the separator substrate; and
   a second coating step of coating all over the power generation area of the separator substrate with a conductive coating, the separator substrate is a continuously flat surface in the region defined by the power generation area, such that the conductive coating is formed directly on said power generation area of the separator substrate and such that the power generation area of the separator substrate can face a membrane electrode assembly in such a manner that the conductive coating does not overlap the resin coating in a direction parallel to a planar surface of the power generation area, and that the resin coating and the conductive coating are in direct contact with each other in a direction perpendicular to the planar surface of the power generation area, wherein the conductive coating in the second coating step is a metal plating formed by electrodeposition, and the resin coating in the peripheral area that comprises the opening functions as a mask for preventing the peripheral area from being coated with the conductive coating during the second coating.

2. The method of claim 1, wherein the separator substrate is a flat plate prior to the coating steps.

3. A method for manufacturing a fuel cell separator comprising a conductive coating and a resin coating formed on a separator substrate, the method comprising:

a masking step of applying a mask to an area corresponding to a power generation area of the separator substrate;

a first coating step of coating a peripheral area of the separator substrate that comprises an opening that functions as a manifold with a resin coating, wherein the area coated with the resin coating in the first coating step surrounds said power generation area of the separator substrate;

a mask removal step of removing said mask; and a second coating step of coating all over the power generation area of the separator substrate with a conductive coating, the separator substrate is a continuously flat surface in the region defined by the power generation area, such that the conductive coating is formed directly on said power generation area of the separator substrate and such that the power generation area of the separator substrate can face a membrane electrode assembly in such a manner that the conductive coating does not overlap the resin coating in a direction parallel to a planar surface of the power generation area, and that the resin coating and the conductive coating are in direct contact with each other in a direction perpendicular to the planar surface of the power generation area, wherein the conductive coating in the second coating step is a metal plating formed by electrodeposition, and the resin coating in the peripheral area that comprises the opening functions as a mask for preventing the peripheral area from being coated with the conductive coating during the second coating.

4. The method of claim 3, wherein the separator substrate is a flat plate prior to the coating steps.

5. The method of claim 1, wherein a single power generation area is coated during said second coating step.

6. The method of claim 3, wherein a single power generation area is coated during said second coating step.

7. The method of claim 5, wherein a single peripheral area is coated during said first coating step.

8. The method of claim 6, wherein a single peripheral area is coated during said first coating step.

* * * * *